United States Patent [19]

Muecke et al.

[11] 3,727,691

[45] Apr. 17, 1973

[54] METHOD AND APPARATUS FOR TREATING SUBTERRANEAN FORMATIONS

[75] Inventors: Thomas W. Muecke; Fred A. Brooks, Jr., both of Houston, Tex.

[73] Assignee: Esso Production Company, Houston, Tex.

[22] Filed: Dec. 16, 1970

[21] Appl. No.: 98,781

[52] U.S. Cl. ................. 166/295, 166/149, 166/300
[51] Int. Cl. ........................ E21b 33/13, E21b 43/27
[58] Field of Search ..................... 166/274, 295, 300, 166/305, 231, 309, 193, 184, 149, 142, 104, 177, 222, 307

[56] References Cited

UNITED STATES PATENTS

| | | | |
|---|---|---|---|
| 2,716,454 | 8/1955 | Abendroth | 166/184 X |
| 3,612,181 | 10/1971 | Brooks | 166/295 |
| 3,157,232 | 11/1964 | Ramos | 166/300 |
| 2,668,592 | 2/1954 | Piros | 166/59 X |

Primary Examiner—Robert L. Wolfe
Attorney—James A. Reilly, John B. Davidson and Lewis H. Eatherton

[57] ABSTRACT

Separate fluids are passed through separate conduits in a wellbore and commingled at a subsurface location to form a single stream which is then passed through a mechanical mixing device. The mechanical mixing device intermixes the two fluids in proportion to their respective volumetric flow rates producing a uniform treating composition which is then forced into contact with the formation to be treated.

15 Claims, 3 Drawing Figures

PATENTED APR 17 1973 3,727,691

INVENTORS
THOMAS W. MUECKE
FRED A. BROOKS, JR.
BY *Robert L. Graham*
ATTORNEY

METHOD AND APPARATUS FOR TREATING SUBTERRANEAN FORMATIONS

BACKGROUND OF THE INVENTION

1. Field of the Invention

The present invention relates to a method and apparatus for intermixing two fluids to produce a uniform composition for treating subterranean formations.

2. Description of the Prior Art

In oil field operations, it frequently becomes necessary to change the physical properties or characteristics of subterranean formations. A variety of well treating techniques have evolved which rely on chemical reactivity of the treating fluid to impart the desired effects on the formation. The fluid systems employed in many of these techniques are composed of a component, usually a polymer, which in the presence of a catalyst reacts with itself to produce the treating composition. In sand consolidation, for example, the reaction of a thermosetting resin is initiated and propagated by contacting the resin with a suitable catalyst.

Fluids employed in other systems are composed of two or more reactive components which when intermixed react to produce the treating composition. Acid solutions for treating formations and certain resin solutions used in sand consolidation can be formulated in this manner.

For ease of handling and storage, it is preferred to delay initiation of the chemical reaction until shortly before the treating operations are commenced. This generally requires that the reactive chemicals be either premixed at the well site preparatory to commencing the treatment or intermixed in the formation to provide in situ reaction. The mixing and placement of these fluids present a variety of operational problems which can best be described with reference to specific well treating techniques.

Considering first sand consolidation, this process is a widely used sand control technique which relies on the in situ polymerization of a thermosetting resin to consolidate portions of an unconsolidated formation. A liquid resin carried in a suitable solvent is first placed in the unconsolidated formation adjacent the wellbore and then with the aid of a suitable curing agent, is caused to harden. The hardened resin binds the sand grains together at the points of contact forming a permeable, competent sheath around the wellbore.

The present methods for initiating the polymerization reaction include (1) premixing the resin and the curing agent at the surface and (2) placing the resin in the formation and then contacting the resin with the curing agent to initiate the reaction in situ of the formation.

In the premixed method, the reactive component or components and the curing agent are intermixed at the surface with conditions being controlled to provide a slow reaction rate. The slow reaction rate permits the composition to be placed in the formation before the resin hardens. This method offers the advantage of a uniform treating composition but presents a serious operational problem in that the resin can harden before the composition is fully placed in the formation. Moreover the reaction of many of the resins used in sand consolidation are highly exothermic and require refrigeration to maintain the temperature at a level below the flash set temperature of the resin. For example, in the base-catalyzed phenol formaldehyde system, dry ice is customarily added to the mixing tanks to maintain the temperature of the fluids at a safe level.

In the in situ method, the resin components used to form the resin or to catalyze the reaction are injected in sequential order into the formation. The intermixing of the resin components necessary to initiate the reaction thus occurs in the formation. Although the in situ method avoids many of the handling problems associated with the premixed method, experience has shown that it is difficult to contact all portions of the placed resinous forming material with the catalyst or resin component. The resinous forming material which is not contacted with the catalyst or resin component fails to harden leaving portions of the formation in the unconsolidated condition. Thus when the well is placed on production, the uncured resin as well as sand will be flushed into the wellbore.

Recently, thermosetting resins have been applied in formation plugging operations. During operation of a producing well, it frequently becomes necessary to control fluid movement in the well. The entry of undesired fluids into the wellbore can result from a variety of well conditions including casing failure, cement failure and the development of gas cones or water cones within the formation. To prevent the entry of these fluids, liquid resins can be placed at or near the point of fluid entry and permitted to harden. The resins, formulated to set with a minimum of shrinkage, plug and seal the formation or voids behind the casing thereby blocking the path of entry of the undesired fluids. The resins are generally placed by the premixed or in situ methods discussed above.

A problem associated with the premixed and in situ methods has been that of initiating the chemical reaction. In the premixed method, the reaction may be initiated too soon, whereas in the in situ method, the reaction may not be initiated at all in portions of the resin.

Another well treating technique that employs reactive chemicals is well acidizing. This widely used stimulation technique relies upon the reactivity of acid solutions to dissolve materials in the formation and thereby improve formation permeability. Generally, the acid solution is premixed and injected into the formation through a tubing string. In order to protect the tubing string and other equipment from attack by the acid, the treating composition generally includes a corrosion inhibitor. The corrosion inhibitors however are not always successful in providing protection for the metal, and some, notably the arsenical type inhibitors, are known to poison catalyst used in refinery operations.

In an effort to alleviate the corrosion problem presented by the acid solution, it has been proposed to employ noncorrosive components which react to form free acid. As disclosed in U.S. Pat. No. 3,157,232, to Joseph Ramas et al., dated Nov. 17, 1964, each fluid component is pumped down a separate conduit and commingled in the wellbore opposite the formation to be treated. The downhole reaction forms free acid which is then forced into the formation. This technique, however, has not been entirely successful, mainly because of the difficulty in obtaining uniform mixing of the separate fluid streams.

Thus, in many well treating operations, there exists a need for improving the downhole mixing of fluid components to produce a uniform treating composition.

SUMMARY OF THE INVENTION

The present invention provides a method and apparatus for intermixing two fluids at a subsurface location to form a uniform well treating composition. Although the invention finds particularly advantageous application in chemically active systems, it can also be used in nonreactive systems where downhole mixing is desired. In either type of system the apparatus produces an intimate mixture of the separate fluids.

If the fluids contain chemically active components or an active component and a catalyst, the chemical reaction is initiated at the subsurface mixing location and thus avoids many of the problems associated with the prior art techniques. The uniform mixing action of the apparatus employed results in a composition equally reactive throughout.

Briefly, the method according to the present invention contemplates the steps of passing different fluids through separate conduits in a wellbore; commingling the separate fluids at a subsurface location to form a single stream; passing the single stream through a mechanical mixing device to intermix the fluids to form a uniform composition; and forcing the uniform composition into contact with the formation to be treated.

Since most well treating operations are performed in cased wellbores, the casing can conveniently serve as one of the conduits and a tubing string lowered into the casing can serve as the other conduit.

The apparatus for performing the method in a cased wellbore comprises a conduit capable of being lowered into the wellbore, a packer for sealing the casing-conduit annulus, valve means disposed above the packer for selectively providing fluid communication between the conduit and the casing-conduit annulus, and a fluid mixing device attached to the lower discharge of the conduit. The conduit, packer, and valve means can be provided by conventional oil field equipment such as jointed tubing, and a retrievable packer equipped with a circulating valve. The mixing device, however, is preferably a motionless type mixer which achieves intermixing of fluid streams by a stream splitting and cross blending flow pattern. This type of mixer is simple in construction, has no moving parts, and achieves a high degree of mixing.

When employing a thermosetting resin in the treatment of a formation, a resin solution can be pumped through the tubing and a liquid curing agent through the casing-tubing annulus. The liquid curing agent passing through the valve means commingles with the resin solution at a point upstream of the mixing device. The commingled streams then flow through the mixing device and are intermixed in proportion to their respective volumetric flow rates. When the resin and curing agent come into contact with each other, the thermosetting chemical reaction is initiated. Alternatively, solutions containing components which react to produce the resin can be pumped separately through the tubing and casing-tubing annulus. In either type of system, the chemical reaction is initiated before the fluids reach the formation. The reactive components can be selected so that the reaction rate is sufficiently slow to permit placement of the intermixed solutions in the formation before the resin reaches the hardened condition. By mixing at a location proximate the formation, however, a much faster reaction rate can be tolerated than that offered by prior art methods. The uniform composition achieved by the present invention also permits a wider selection in curing agents than could be used in the in situ method. In that method the curing agent was selected for its ability to initiate the chemical reaction with only a minimum of mixing. The uniform mixing afforded by the present invention permits the use of curing agents which are effective only when thoroughly intermixed with the resin solution.

In the application of the present invention in acidizing operations, the reactive components can be ammonium salt and formaldehyde. It is known that these materials react to form a free acid such as HCl or $HNO_3$ depending upon the specific ammonium salt selected. If it is desired to treat a calcareous formation with HCl the salt can be ammonium chloride. In such a treatment, an aqueous formaldehyde solution can be pumped through the well conduit and an aqueous ammonium chloride solution can be pumped through the casing-conduit annulus. The two solutions commingle in the conduit in proportion to their respective pumping rates. The commingled solutions then pass through the mixing device becoming uniformly intermixed. The reaction which produces the HCl is initiated in the conduit and the intermixing afforded by the mixing device results in a uniform treating composition which can then be forced into the formation.

The present invention is described in detail below with reference to specific treating operations. It should be observed however that the method and apparatus described and claimed herein can be applied in other types of well treating operations which employ a composition having at least two intermixed fluid components.

DESCRIPTION OF THE PREFERRED EMBODIMENTS

As mentioned above, the present invention can be employed in a variety of operations for treating subterranean formations. All of the treatments contemplated by the present invention have in common the object of altering certain physical or chemical properties of the formation by injecting into that formation two intermixed fluids. These treatments are designed to improve the operation of the well by alleviating certain mechanical problems or by stimulating the productivity of the well. More specifically the invention can be applied in sand control, formation plugging, or acidizing operations. The apparatus for practicing the invention will generally be the same but the manipulative steps and fluids used will vary depending upon the treatment being performed. Accordingly, the description of the invention will first relate to the apparatus in general and then to specific treatment methods in which the apparatus can be employed.

Figure 1:
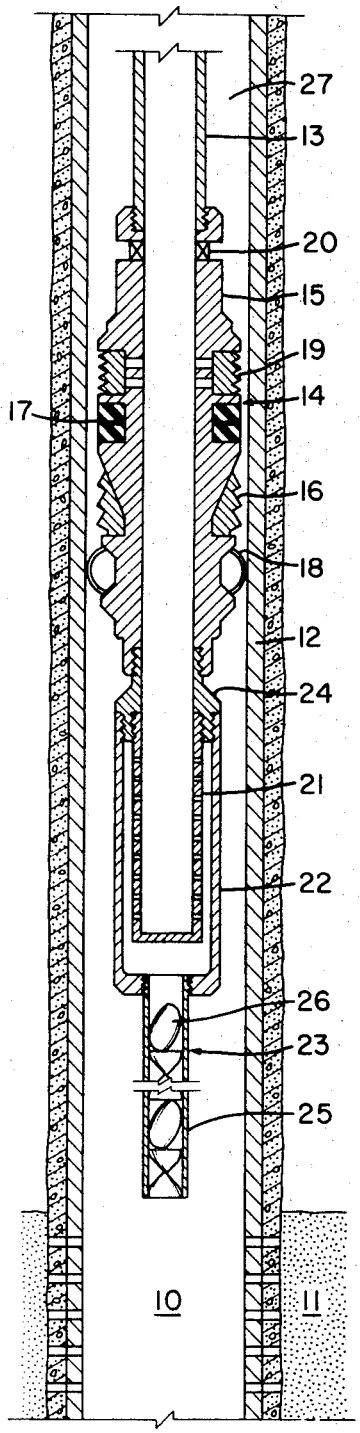
FIG. 1 is a sectional view illustrating the condition of the well treating apparatus as run in a cased wellbore.

Referring to FIG. 1, a typical well completion is seen to comprise a cased wellbore 10 penetrating a subterranean formation 11. The casing string 12 is set through the formation 11 and is cemented in place. Perforations in the producing interval provide fluid communication between the formation 11 and wellbore 10. In treating a subterranean formation, it is customary to lower into the wellbore 10 a tubing string for conducting the fluids from the surface to an elevation proximate the formation to be treated. In the apparatus of the present invention, the tubing string 13 can be conventional jointed tubing. Attached to the lower end of the tubing string 13 is a retrievable packer 14 which can be any one of a variety of packers used in formation treating operations. More specifically, the packer 14 can be a model RTTS packer manufactured by Halliburton Company. As schematically illustrated in the drawing, this type of packer comprises a full opening mandrel 15, slip and cone assemblies 16, a sealing element 17, friction bows 18, hold-down slips 19, and a bypass valve 20. The packer 14 is set by applying a right-hand torque to release a J-slot setting mechanism and then applying a compressive load on the packer. This causes the packer slips 16 to engage the casing wall and permits the applications of additional compressive loading to force the rubber sealing elements 17 outwardly against the casing wall. The expanded rubber sealing elements 17 provide a fluid tight seal between the casing 12 and mandrel 15. The bypass valve 20 which is positioned above the sealing elements 17 can be selectively opened or closed by manipulating the tubing string 13 at the surface.

The use and construction of the packer and tubing assemblies is well known in the art. The apparatus according to the present invention modifies this conventional assembly by the provision of a mechanical mixing device 23. If more than one fluid is to be pumped through the tubing string 13, and if separation balls or plugs are required to maintain the fluids segregated, it may be desirable to include a ball catcher tube in the assembly. In the present embodiment the apparatus is provided with a ball catcher, but some operations may not require the use of separation devices, in which case the design can be somewhat simplified. As illustrated, the apparatus which can be preassembled for attachment to the packer mandrel 15, includes a perforated tube 21, a hollow cylindrical housing 22, and a cylindrical mechanical mixing device 23. By means of a suitable sub 24, the perforated tube 21 is mounted in concentric relation to the housing 22. The inside diameter of the sub 24, the tube 21, the mandrel 15, and the tubing 13 are the same so that with the parts assembled, the flow area from the surface through the perforated tube 21 is constant. The constant flow area enables the use of separation balls or similar devices to maintain fluids segregated during pumping operations. The lower end of the tube 21 is capped to catch and retain balls received in the tube 21. The length of the tube 21 can be sized in relation to the number of balls used so that when the final ball enters the tube 21, the perforations are sealed. Thus, when the last ball enters the tube 21, the surface pump pressure will increase sharply indicating that all of the fluid used in the treatment has passed the packer 14.

The mixing device 23 can be any one of a variety of mechanical mixers but preferably is a motionless in-line mixer. The simplicity of this type of mixer lends itself for easy installation in downhole equipment and has no moving parts which could malfunction. The motionless in-line mixer achieves intermixing of a process stream by multiple stream splitting and cross blending action. Basically, this type of mixer comprises a hollow tube and a plurality of specially configured baffles or elements positioned in an in-line relation in the tube. The baffle leading edges traverse portions of the mixer tube dividing the flow area into at least two flow channels. The baffles are configured to direct the separated streams in a predetermined tortuous path to achieve cross blending and further stream splitting. The degree of mixing is related to the degree of stream splitting which in turn is a function of the number of baffles. Although there are a number of commercially available motionless mixers, all operate on the stream splitting action to achieve intermixing. Motionless type mixers are disclosed in U.S. Pat. Nos. 2,894,732; 3,051,453; 3,195,865; and 3,286,992.

A particularly versatile motionless mixer which can easily be adapted for service in the present invention is the "Static Mixer" (a registered trademark) manufactured by Kenics Corporation. As shown in FIG. 1, the "Static Mixer" 23 is simple in construction comprising a hollow tube 25 and a plurality of curved baffles 26. The baffles 26 positioned in-line in tube 25 can be arranged in alternating right-hand and left-hand baffles. The right-hand and left-hand baffles can be separately prepared by twisting a band of metal to form a helix and then cutting the twisted band to give pieces having a half twist. The alternating left-hand and right-hand baffles are then welded together in in-line relation. The element assembly then can be inserted in the tube and fastened thereto by welding or use of adhesives. If plastics are used the left-hand and right-hand baffles can be molded and assembled in the tube by adhesives. The tube 25 can be threaded for connection to the lower end of the housing 22 as illustrated in the drawing.

The number of the in-line baffles, which determine the degree of mixing, can be varied to suit a particular operation. Generally, from 10 to 30 baffles are sufficient to provide a high degree of mixing. This range of baffles provides a tube length of about 10 to 30 tube diameters. The diameter of the tube 25 will generally be less than or equal to the diameter of the tubing string 13. For example, if 1 inch tubing is used, the mixer tube 25 may have a diameter of 1 inch or less. The parts 24, 21, 22, and 23 can be preassembled as a unit for connection to the packer 14. In some operations it may be desirable to use plastics or other drillable material such as aluminum or magnesium in the manufacture of these parts. If the unit becomes stuck in the wellbore or dislodges from the packer 14, the drillable material could easily be fragmented and removed from the wellbore.

In commencing the treating operation, the assemblies as illustrated in FIG. 1 are lowered into the wellbore 10 to the proper setting depth. The packer 14 is then set forcing the sealing elements 17 in engagement with the interior of casing 12. The conduit for conducting fluid from the surface to the mixer then comprises the tubing string 13, the packer mandrel 15, the sub 23, and the housing 21. A second conduit is provided by the annulus 27 defined by the casing 12 and tubing 13.

The method of the present invention which can be performed by the apparatus described above as well as modifications thereof will be described first in connection with the use of thermosetting resins and then in connection with well stimulation operations.

As mentioned previously, a frequently employed sand control technique involves the placement of a liquid resin in the formation and causing the resin to harden to form a solid matrix which binds the incompetent sands of the formation together at the points of contact. This technique relies upon the conversion of the liquid resin into a solid by means of a thermosetting chemical reaction. From a practical standpoint, a curing agent is required to initiate the thermosetting reaction. Curing agents can be accelerators which catalyze the reaction of the resin with itself or can be a hardener which becomes a chemical part of the cured resin.

A sand consolidation treatment in accordance with the present invention can employ the following fluids: (1) a liquid preflush, (2) a liquid resin, (3) a liquid curing agent, and (4) a liquid afterflush. The well completion fluid also must be considered in the design of a sand consolidation treatment. This fluid normally is diesel oil having a specific gravity of about 0.82.

A preflush can contain a coupling agent or other chemicals which enhance the bonding of the resin to the sand grains. A preferred preflush consists of a low molecular weight glycol ether or glycol ether solution. The preflush liquid generally has a specific gravity of about 0.91 which is slightly higher than that of diesel oil.

The resin can be an epoxy resin, a phenol-formaldehyde resin, and a furfuryl alcohol resin or any other resin usable in sand consolidation operations.

When using an epoxy resin, the resin can be glycidyl ether made from bisphenol A and epichlorohydrin. In this system, the resin solution can be prepared by dissolving the resin in a diluent such as acetone or aromatic hydrocarbon oil fractions.

The curing agents for epoxy resins include diethylene triamine, ethylene diamine, triethylene tetramine, dimethylamino propylamine, diethyl-amino propylamine, piperidine, methane diamine, triethylamine, benzyl di-ethylene diethylamino phenol, ditrimethylaminomethylphenol, α methylbenzyl dimethylamine, metaxylene diamine, 4,4-methylene dianiline, and mixtures of such amines. Acidic catalysts include oxalic acid, pthalic acid, pyromellitic acid, pyromellitic dianhydride and dodecenyl succinic anhydride. These curing agents can be used in pure form or in suitable solvents.

The phenol formaldehyde resins are prepared by the reaction of formaldehyde, acetaldehyde, propionaldehyde, or a mixture of water-soluble aldehydes with low molecular weight hydroxy aryl compounds such as phenol, cresol, β naphthol, resorcinal, xylenol, cresilic acid, or a mixture of such compounds in a weight ratio between 1 to 1 and about 9 to 1. One solution can contain formalyn (37.5 weight percent formaldehyde, 13.5 weight percent of methyl alcohol) and a second solution can contain the hydroxy aryl component, usually phenol or cresol and a suitable curing agent. In this system, the polymerization reaction is initiated when the reactive components, e.g., formalyn and phenol are brought together in the presence of a curing agent. The curing agent necessary for catalyzing the reaction can be an alkaline catalyst such as guanidine carbonate, amino guanidine bicarbonate, sodium hydroxide, sodium carbonate, ethylamine, triethylamine, analine, ethylene diamine, or the like. Also usable are acid catalysts such as stannous chloride, magnesium chloride, hydrochloric acid, sulfuric acid, maleic anhydride, picric acid, benzene sulfonic acid, sulfanilic acid, α naphthylamine sulfonic acid, sodium-1 naphthylamine-3, 6,8-trisulfonate, and the like. From about 0.25 percent to about 10 percent by weight based on the aldehyde hydroxy aryl compound of the catalyst is required.

In the furfuryl alcohol system, the resin solution can consist of furfuryl alcohol alone, or a mixture of furfuryl alcohol and an aldehyde such as formaldehyde and furfural. The curing agent can be an organic acid such as trichloroacetic, or phosphoric acid. In the presence of the acid, furfuryl alcohol reacts with itself to form homopolymers or with the aldehyde or other aldehyde resins, e.g. urea-formaldehyde or melanine-formaldehyde, to form copolymers. Because of their high volumetric yield the furfuryl alcohol systems are particularly useful in formation plugging treatments.

The use, formulation, and technique for preparation of the solutions for the various systems discussed above can be found in the literature.

The operational steps for performing the method of the present invention will be described in connection with a treatment employing an epoxy resin. However, it should be emphasized that the manipulative steps will be generally the same for other types of resins mentioned above.

Preparatory to commencing the treatment operations, the fluids to be used in the treatment are prepared at well site. The liquid preflush can be glycol ether alone or a solution of glycol ether. The glycol ether can be purchased from Enjay Chemical Company under the trade name Butyl Jaysolve. About 50 gallons of this liquid per foot of interval to be treated is sufficient for most applications. The resin solution is prepared by adding a liquid epoxy such as Araldyte 6005, a trade name of CIBA Products Company, to acetone in a volume ratio of about 4 to 1. About 0.5 volume percent of an organo-functional silane coupling agent is then added to the resin solution. The volume of the resin solution should be sufficient to provide a treatment of about 60 gallons per foot of interval to be treated. A liquid curing agent for the epoxy resin can be Curing Agent Z, an epoxy hardener manufactured by Shell Chemical Company. This curing agent can be used in pure form or in a suitable solvent miscible with the epoxy resin. The afterflush liquid can be about 250 gallons of paraffinic white oil having a viscosity slightly greater than the resin solution.

Figure 2:
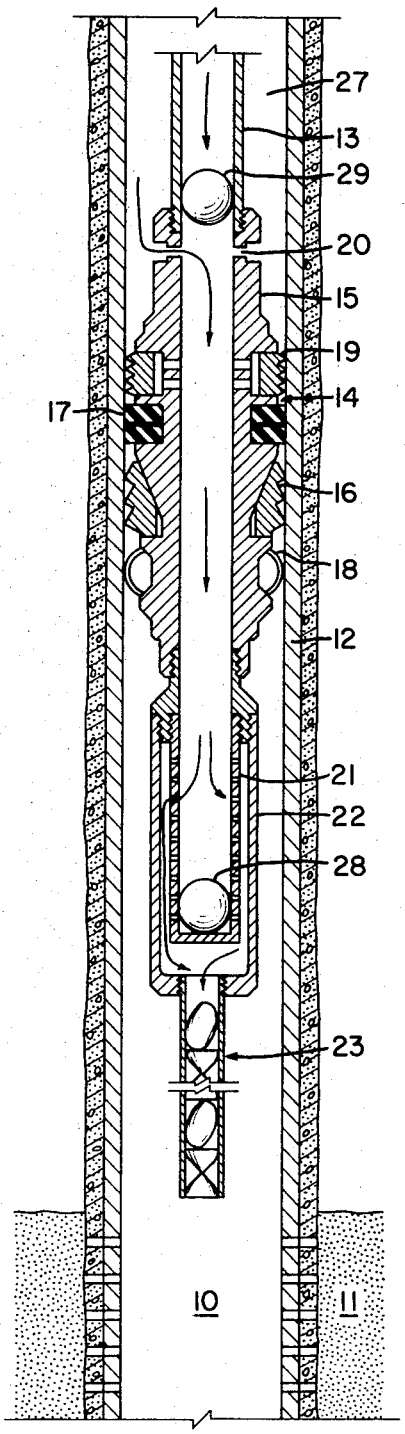
FIG. 2 is a view similar to FIG. 1 showing the apparatus in the operating position.
Figure 3:
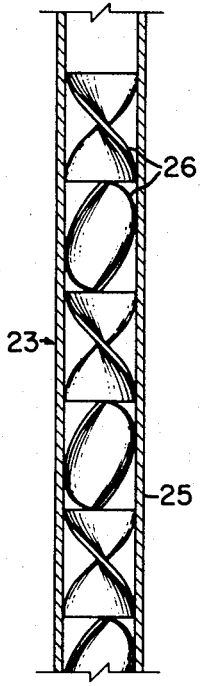
FIG. 3 is an enlarged, sectional view of a motionless type mixing device usable in the present invention.

With reference to FIG. 1, the well is first brought under control by pumping salt water down the casing 12. The tubing string 13 equipped with the apparatus shown is then run into wellbore 10 and located with a packer 14 disposed above the perforated interval. With the packer 14 unseated, the salt water is circulated from the well by pumping diesel oil down the tubing 13 while taking returns on the casing. Next, the packer 14 is set by manipulating the tubing string 13. This isolates the casing-tubing annulus 27 from the tubing string. With the circulating valve 20 open, the liquid curing agent is then pumped through the casing-tubing annulus 27 while taking returns on the tubing string at the surface. The volume of the curing agent and the followup solution is carefully metered so that the leading end of the curing agent in the annulus 27 is located near the packer 14. Next, the circulating valve 20 is closed by manipulating the tubing string 13. The preflush fluid is then pumped down the tubing with at least one separation ball 28 separating the diesel oil and the preflush fluid. The separation ball can be composed of rubber or other resilient material and should have a diameter approximately equal to the inside diameter of the tubing 13. The preflush fluid is followed with the resin solution and at least one more separation ball 29. The volume of the resin solution pumped through the tubing 13 is carefully metered to spot the leading end of the resin solution in the packer 14. With the resin solution and curing agent thus located in the separate conduits, the bypass valve 20 is opened by manipulating the tubing 13 at the surface placing the equipment in the position shown in FIG. 2. Immediately following this operation, the resin solution and liquid curing agent or followup fluids are respectively pumped through the casing-tubing annulus and the tubing at volumetric rates of about 4 to 1. The liquid curing agent flows through the bypass valve 20 commingling with the resin solution to form a single stream. The pumping rates of the two fluids should provide a volumetric flow rate of about 10 to 30 gallons per minute. The commingled fluids pass through the mandrel 15, through the perforations of the ball catcher tube 21 and, finally, through the mixing device 23, As shown in FIG. 2, the first separation ball 28 is caught and retained in tube 21. In flowing through the mixing device, the fluids are thoroughly intermixed in the 4 to 1 volumetric ratio providing a uniform composition discharging into the wellbore 10. This composition is then forced into the formation. After the resin solution has been introduced into the tubing at the surface, a third separation ball (not shown) is placed in the tubing and is followed with the afterflush fluid. The afterflush is followed with the diesel oil and pumping is carefully controlled so that when the afterflush fluid has entered the formation, pumping is discontinued. The well is then shut in for about 12 to 24 hours to permit the resin to harden.

Another application of thermosetting resins in formation treating operation is found in well remedial operations used for plugging formations or sealing around the casing to prevent entry of undesired fluids into the wellbore. In this type of operation, the resin can be the same as that used in sand consolidation with the epoxy resins and the furfuryl alcohol resins being preferred. The equipment and manipulative steps described above for the sand consolidation treatment can generally be the same for the formation plugging except that the afterflush will not be employed. Thus after the resin is placed and permitted to harden, it provides a plug or a seal at a location of fluid entry.

When applied in formation acidizing, the present invention avoids many of the problems of corrosion associated with prior art acidizing techniques. It has long been known that the reaction of formaldehyde and ammonium salt produces free acid (see Formaldehyde, Second Edition, J. Frederick Walker, 1953). The reaction can be represented as follows:

$$6CH_2O + 4NH_4Cl \rightarrow C_6H_{12}N_4 \cdot HCl + 3HCl + 6H_2O$$

Other acids such as nitric, hydrofluoric, acetic, citric, formic, sulfuric etc. can also be produced by selecting the proper ammonium salt. However, since hydrochloric acid is the most common acid employed in acid stimulation treatments, the present invention will be described in connection with formaldehyde and the ammonium chloride solutions.

These two solutions are noncorrosive and therefore can be safely stored and handled. As mentioned previously, it is preferred to maintain two reactive components segregated and to bring them into contact with one another at a subsurface location, preferably opposite the zone to be treated. It has been proposed to pump the two solutions separately down the tubing and casing-tubing annulus and commingle the solutions in the wellbore at a subsurface location. The effectiveness of this technique depends, in part, upon uniform intermixing of the component solutions. If the components are not uniformly dispersed the reaction which produces the HCl will be incomplete leaving portions free of any acid. By employing the apparatus and technique of the present invention, a uniform acid composition is insured.

The mixing and placement can be performed by providing at the surface an aqueous solution of formaldehyde and an aqueous solution of ammonium chloride. The concentrations of the formaldehyde and ammonium chloride solutions can vary within wide ranges but preferably should be about 37 and 25 percent by weight, respectively. With the equipment positioned as shown in FIG. 1, the ammonium salt solution can be pumped through the casing-tubing annulus 27 and spotted opposite the packer 14. The packer 14 is then set sealing the casing-tubing annulus 27, and the formaldehyde solution is pumped through the tubing string, employing a separation ball between the formaldehyde solution and the diesel oil or other completion fluid. When the leading portion of the formaldehyde solution reaches the packer 14 pumping is discontinued. The two solutions located in the respective conduits now are in position for commencing the commingling step of the operation. The packer bypass valve 20 is opened by manipulating the tubing and the pumping operations are begun. The ammonium chloride solution and formaldehyde solution are pumped simultaneously through their respective conduits and are commingled in the packer mandrel 15 in proportion to their respective flow rates, forming a single stream. In the concentrations discussed above, the respective volumetric flow rates can be at a ratio of 1 to 2. This initiates the chemical reaction which produces the free acid. The single stream then flows through the ball catcher tube 21 and enters the mixer 23. The stream splitting and cross blending of the mixer causes the components to react completely producing a uniform acid solution. The acid solution discharging from the mixer 23 is then forced into the formation and permitted to react therewith. The volumes of the fluid components used preferably should be sufficient to produce about 500 gallons of the acid solution per foot of interval to be treated.

The essence of the well treating method described in the above embodiments is in the downhole mixing of two fluids using a subsurface mixer. While the method and apparatus are particularly useful in chemically active systems, they can also be employed in other types of well treating operation.

We claim:

1. A method for treating a subterranean formation surrounding a wellbore which comprises passing different fluids through separate conduits in the wellbore; commingling said separate fluids at a subsurface location to form a single stream; intermixing the commingled fluids by flowing said single stream through a mechanical mixing device to form a uniform treating composition; and forcing said treating composition into contact with the formation.

2. The invention as recited in claim 1 wherein said intermixing of the commingled fluids is by stream splitting and cross blending flow action.

3. The invention as recited in claim 1 wherein one of said fluids contains a chemically active material capable of reacting with itself to produce a resinous treating composition, and the other of said fluids contains a catalyst capable of initiating the reaction of said chemically active material.

4. The invention as recited in claim 3 wherein said chemically active material is a liquid thermosetting resin which, in the presence of said catalyst, reacts to form a solid resin, and wherein the step of forcing the resinous composition in contact with the formation is performed before the reaction is complete.

5. The invention as recited in claim 4 wherein said liquid thermosetting resin is an epoxy resin.

6. The invention as recited in claim 4 wherein said thermosetting resin is a furfuryl alcohol and wherein said catalyst is an acid capable of causing said furfuryl alcohol to polymerize.

7. The invention as recited in claim 1 wherein said fluids contain separate components which coreact to produce the treating composition.

8. The invention as recited in claim 7 wherein one of said components is a liquid thermosetting resin and wherein the other of said components is a curing agent reactive with said thermosetting resin to produce a solid resinous material, and wherein the step of forcing said composition into contact with the formation is performed before the reaction is complete.

9. The invention as recited in claim 8 wherein said thermosetting resin is an epoxy resin.

10. The invention as recited in claim 7 wherein one of said components is a water-soluble aldehyde and the other of said components is a hydroxy aryl compound capable of reacting with the aldehyde to form a resin.

11. The invention as recited in claim 7 wherein said components are resins capable of reacting to form copolymers.

12. The invention as recited in claim 7 wherein one of said components is formaldehyde and the other of said components is an ammonium salt capable of reacting with the formaldehyde to produce a free acid.

13. In a well treating apparatus for use in cased wellbores and having a conduit capable of being lowered in said wellbore, packing means for sealing the casing-conduit annulus, and valve means disposed above said packing means for providing fluid communication between the conduit and the casing-conduit annulus, the improvement comprising a fluid mixing device connected to the lower discharge of said conduit, said mixing device including fluid stream splitting and cross blending means.

14. An apparatus for intermixing two fluids in a wellbore to produce a formation treating composition which comprises a first conduit in said wellbore having a lower end located proximate said formation; a second conduit in said wellbore connected in fluid communication with said first conduit above said lower end so that fluids flowing through said second conduit discharge into said first conduit; a mixing device connected to the lower end of said first conduit, said mixing device comprising a tube and a plurality of baffles disposed transversely across the interior of said tube, said baffles being configurated to divide and cross blend a fluid stream flowing through said tube.

15. The invention as recited in claim 14 wherein said apparatus further comprises a tube concentrically mounted in the lower end of said first conduit and upstream from said mixing device, said tube being adapted to receive and retain liquid separation devices pumped through said first conduit while permitting the passage of fluid therethrough.

* * * * *